Figure 1:
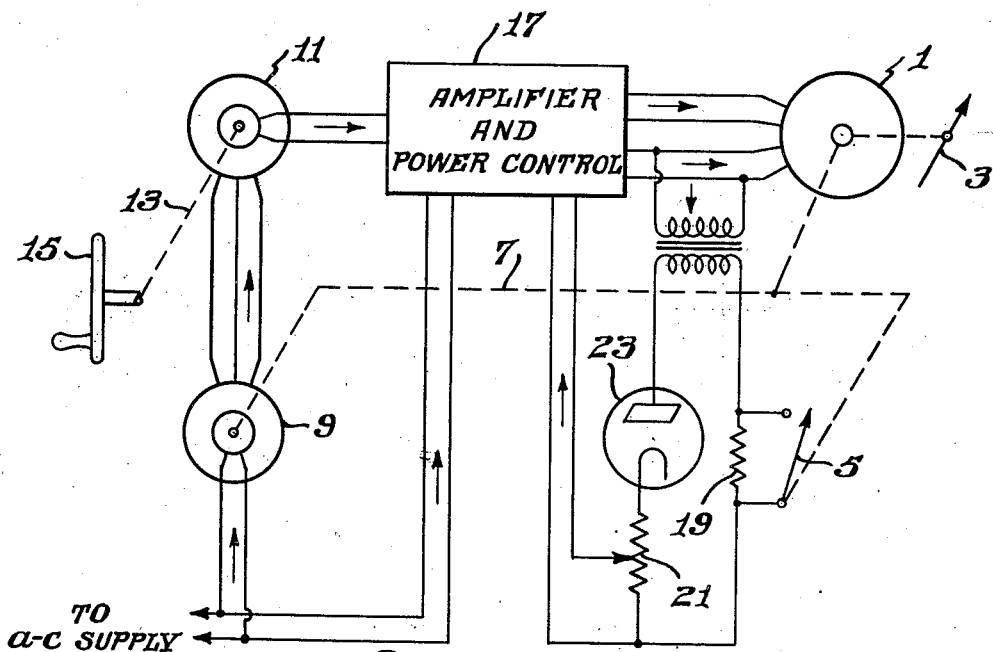

Nov. 21, 1944. R. N. LESNICK 2,363,342
SERVO SYSTEM
Filed July 29, 1942

Inventor
ROBERT N. LESNICK
By C.D. Tuska
Attorney provided to supply the plate and grid bias voltages for the amplifier 27.

The operation of the system is as follows: As long as the control shaft 13 and the output shaft 7 are stationary and in positional agreement, no voltage appears at the secondary of the transformer 11, and hence there is no input to the control device 17. When either shaft is displaced, however, there is produced a voltage related in magnitude and phase to the extent and direction of the displacement. This voltage is compared in phase with the line voltage in the device 25, which produces a unidirectional voltage having a polarity related to the direction of the displacement and a magnitude related to the extent of the displacement. This voltage is amplified and used to control the power stage 29 to energize the motor 1 so as to drive the output shaft 7, and with it the load 3, toward a position corresponding to that of the input shaft 13.

The voltage across a winding of the motor 1 is a function of the speed of rotation of the motor and hence may be used to provide velocity feedback. This voltage is rectified by the device 23 to produce a unidirectional voltage across the resistor 21. A portion of the rectified voltage is applied to the device 17 to oppose the effect of the displacement voltage.

To reduce the effective feedback at high motor speeds, the resistor 19 is connected in series with the rectifier circuit. At motor speeds greater than a predetermined value, the switch 5 operates to insert the resistor 19 and provide decreased feedback.

Thus the invention has been described as an improved stabilizing arrangement for servo systems. A velocity signal is derived and is applied to oppose the effect of the displacement signal to reduce the sensitivity of the system with increase in speed of the driving motor up to a predetermined speed. Control of the feedback level in response to the motor speed offers the advantage of automatic adjustment of the feedback delay time to meet varying conditions of low speed and high speed operation.

I claim as my invention:

1. A servo system including an input shaft, an output shaft, means for deriving a control signal related to the difference in the angular positions of said shafts, means responsive to said signal to control a motor connected to said output shaft so as to drive said output shaft toward positional agreement with said input shaft, means responsive to the counter electromotive force of said motor to produce a second signal tending to oppose said control signal, and means responsive to the speed of said motor to vary the magnitude of said second signal.

2. A positional control system comprising a control shaft, a controlled shaft, means for deriving a unidirectional control voltage related to the difference in the angular positions of said shafts, an electric motor mechanically connected to said controlled shaft, means for deriving a unidirectional feedback voltage related in magnitude to the counter electromotive force of said motor and opposing said control voltage, means responsive to the combined effects of said control voltage and said feedback voltage to cause said motor to operate to drive said output shaft toward positional agreement with said input shaft, and means responsive to the speed of said motor to vary the magnitude of said feedback voltage.

3. In a positional control for driving a controlled shaft toward angular positional agreement with a control shaft, means for producing and receiving a signal, a reversible power motor for driving the controlled shaft, a thermionic tube circuit for controlling said motor in accordance with said signal, feedback means for producing a direct current feedback in said circuit for rendering said circuit less sensitive after said motor has started, and means responsive to the speed of said motor for controlling the effect of said feedback.

4. A remote control system comprising a motor, electron discharge means arranged to control the energization of said motor in response to a signal, means responsive to the terminal voltage of said motor to reduce the sensitivity of said electron discharge means to said signal, and means responsive to the speed of said motor to reduce the sensitivity of said terminal voltage responsive means.

5. A servo system comprising input and output shafts, Selsyn transformers on said shafts interconnected to provide an overall transformation ratio related to the difference between the angular positions of said shafts, controlled rectifiers with power input circuits connected through said transformers to a source of alternating current and control input circuits connected to said source, whereby unidirectional voltages related in magnitude to said difference in angular positions are produced, thermionic tubes connected to be controlled by said unidirectional voltages so as to vary in impedance, a motor connected to said A.-C. source through a circuit effectively including the impedances of said tubes, a mechanical connection between said motor and said output shaft, a feedback rectifier connected across said motor to provide a unidirectional voltage proportional to the terminal voltage of said motor, electrical connections between said feedback rectifier and said controlled rectifiers whereby the output of said feedback rectifier opposes in effect the output of said controlled rectifiers, a resistor connected in the circuit of said feedback rectifier so as to decrease the output of said rectifier, and a speed responsive switch connected across said resistor.

6. An anti-hunting system for electrical follow-ups including means for deriving a control signal, means for deriving a feedback signal to oppose said control signal, and speed responsive means arranged to control the amplitude of said feedback signal.

7. The method of stabilizing a servo system which includes the steps of deriving a control signal, deriving a second signal in opposition to said first signal and related to the response of said servo system to the difference between said first and said second signals, and controlling the effect of said second signal in accordance with the speed of operation of a component of said servo system.

ROBERT N. LESNICK.

Patented Nov. 21, 1944

2,363,342

UNITED STATES PATENT OFFICE 2,363,342

SERVO SYSTEM

Robert N. Lesnick, Camden, N. J., assignor to Radio Corporation of America, a corporation of Delaware Application July 29, 1942, Serial No. 452,757

7 Claims. (Cl. 172—239)

This invention relates to servo systems, and particularly to the stabilization of electrically controlled systems for operating a load or output shaft to an angular position corresponding to that of a movable control or input shaft. Systems of this type generally operate by deriving a control voltage related to the difference in the positions of the two shafts and using this voltage to control a driving motor so as to move the output shaft to a position corresponding to that of the input shaft.

When the control effect is a function only of the relative angular displacement of the input and output shafts, faulty operation of the system is likely to occur due to low or zero energization of the driving motor when the two shafts are in or near positional agreement. Mere increase in the sensitivity as by amplification of the displacement signal, will only make the system more unstable, since a small displacement will cause the driving motor to overrun and reverse periodically about the true position.

One method of improving the operation is to derive an auxiliary signal related to the angular velocity of the driven shaft and add this velocity signal in opposition to the displacement signal, through a time delay network. This decreases the effect of the displacement signal while the motor is running, and may overcome the displacement signal completely while the motor is decelerating. When the motor is just starting, the velocity signal, being delayed has no effect and allows the full displacement signal to operate initially. Thus, by using relatively high amplification of the displacement signal and time delayed negative feedback of the velocity signal, the accuracy of the system is improved and the tendency to hunt is reduced.

Delayed velocity feedback is not, however, entirely successful, particularly if the velocity of the control shaft is widely variable, because different feedback ratios are required for ideal operation at different velocities. This difficulty is overcome in the present invention by controlling the ratio of the velocity feedback in response to the velocity itself; the feedback is decreased after the driving motor has attained a predetermined speed, independently of the time elapsed after the initial movement of the control shaft. Similarly, the feedback is increased when the motor speed falls below a predetermined value, regardless of the rate at which the motor decelerates to that speed.

Accordingly, it is an object of this invention to provide an improved method of and means for stabilizing electrically controlled servo systems.

Another object is to provide an improved method of and means for introducing a velocity component in the motor control signal of a servo system.

A further object is to provide improved means for ensuring proper stabilization of a servo system over a wide range of velocity.

Figure 2:
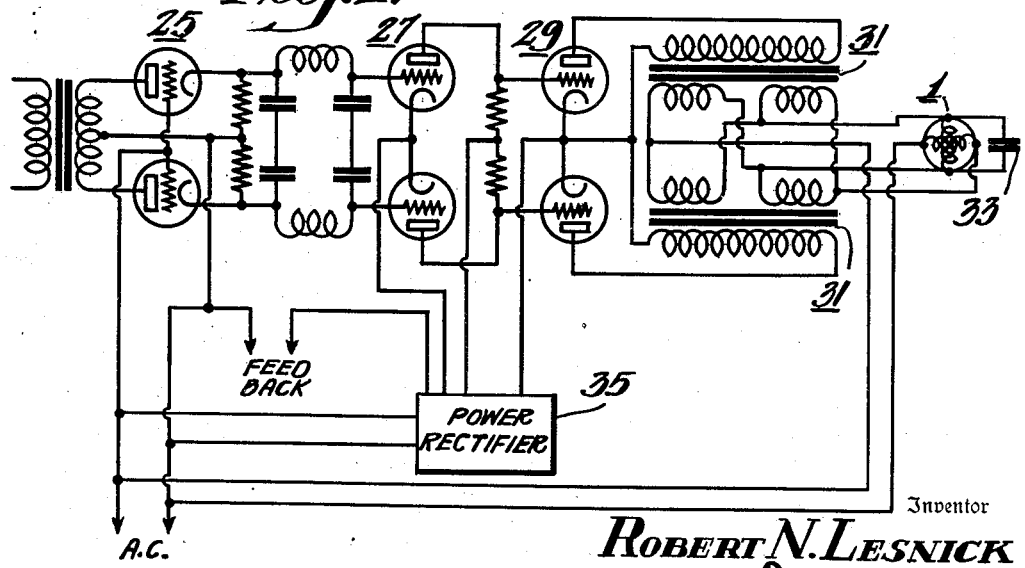

Other and incidental objects will become apparent to those skilled in the art upon consideration of the following description, with reference to the drawing, of which Fig. 1 is a schematic representation of a servo system embodying the invention, and Fig. 2 is a circuit diagram of an amplifier and power control device.

Referring to Fig. 1, a reversible electric motor 1, which may for example be an induction motor, is connected to a load diagrammatically represented by an arrow 3. The motor 1 is provided with a centrifugal switch 5, which is arranged to open when the motor speed exceeds a predetermined value. Also connected to the load, by a shaft schematically indicated by the dashed line 7, is a "Selsyn" transformer 9. The stator winding of the transformer 9 is connected to the stator of a transformer 11, which may be identical to the device 9. The rotor of the transformer 11 is mechanically connected to a control shaft 13, which may be provided with a hand wheel 15 for manual operation. The switch 5 may be connected to the shaft 13 rather than the output shaft, if desired.

The rotor of the transformer 9 is electrically connected to an alternating current supply, not shown, and the rotor of the transformer 11 is connected to an amplifier and power control device 17. Referring to Fig. 2, the device 17 may comprise a grid controlled rectifier or balanced modulator 25, an amplifier 27, and a power control stage 29 connected between the motor 1 and the A.-C. supply. A feedback circuit, comprising the switch 5, resistors 19 and 21, and a rectifier 23 is connected across one winding of the motor 1 and to the control device 17. A pair of transformers 31 have their primaries connected between anode and cathode of the tubes 29, and secondaries connected in a bridge circuit. One winding of the motor 1 is connected across one diagonal of the bridge, and the other winding is connected in series with the A.-C. line to the other diagonal. A capacitor 33 is shunted across one of the motor windings to provide two phase operation. A conventional power rectifier 35 is